United States Patent Office 3,016,286
Patented Jan. 9, 1962

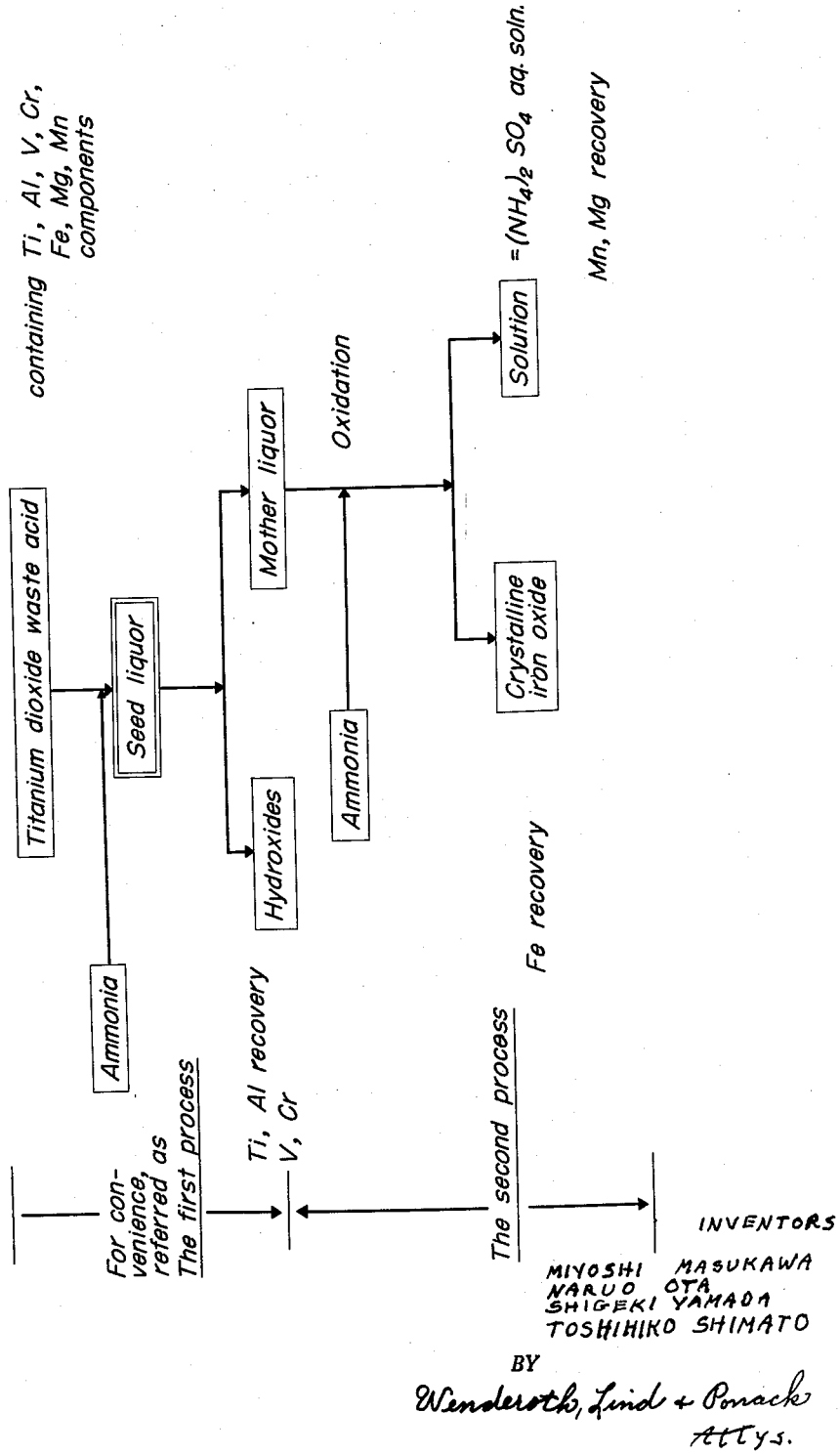

3,016,286
METHOD FOR THE TREATMENT OF WASTE ACID RESULTING FROM TITANIUM DIOXIDE PRODUCTION
Miyoshi Masukawa and Naruo Ota, Yokkaichi-shi, Shigeki Yamada, Suzuka-shi, and Toshihiko Shimato, Yokkaichi-shi, Japan, assignors to Ishihara Sangyo Kaisha Ltd., Osaka, Japan, a corporation of Japan
Filed Feb. 29, 1960, Ser. No. 11,620
7 Claims. (Cl. 23—118)

This invention relates to the treatment of waste acid resulting from the production of titanium dioxide according to the sulfuric acid process, and is aimed at the complete recovery and effective re-utilization of all useful components in the said waste acid.

The method most widely employed for the production of titanium dioxide is that commonly known as the sulfuric acid process, in which a titanyl sulfuric acid solution is formed through the reaction of a titanium-containing ore, a titanium-containing slag or a mixture of both on sulfuric acid. The majority of titanium-containing ores used for the production of titanium dioxide pigments consists of such iron-containing titanium ores generally known as ilmenite and arizonite, which exist throughout the world. At present they are being exploited in several countries including India, Norway, Canada, Australia, Malaya and Brazil as well as in the States of New York, North Carolina and Virginia in America, and usually contain silicon, aluminum, magnesium, calcium, manganese, vanadium and chromium etc. in addition to titanium and iron, although some differences exist depending on the type or place of production. Representative among the titanium-containing slags employed for titanium dioxide production is that supplied by the Quebec Iron & Titanium Corporation of Sorel, Quebec. This slag is refined by reducing smelting the iron-containing titanium ore and removing the fused iron, and possesses a high titanium content. In addition to titanium and iron, this slag usually contains silicon, aluminum, magnesium, calcium, manganese, vanadium and chromium, the contents of these metal components with the exception of iron being generally somewhat higher as compared with those of the iron-containing titanium ore used for raw material. According to the sulfuric acid process for titanium dioxide manufacture, the titanyl sulfuric acid solution obtained by the reaction of the afore-mentioned ore, slag or a mixture of both on sulfuric acid is subjected to thermol hydrolysis, the titanium content alone is precipitated and recovered from the mother liquor. For this reason, the mother liquor discharged in this manner, that is to say, the waste sulfuric acid (hereinafter termed "titanium dioxide waste acid") contains a large amount of iron ion and a certain quantity of metal ions such as aluminum, titanium, magnesium, manganese, vanadium, chromium etc. as well as a considerable amount of $SO_4$-ion, all of which form sulfuric acid-soluble components in the ore or slag employed as raw material. While the ion concentration varies according to the particular type of ore or slag used and production conditions, the mother liquor, i.e. titanium dioxide waste acid is usually of the following composition (see Table 1) and is produced in a ratio of 5 to 10 m.³ per ton of titanium dioxide.

TABLE 1

| Total—$H_2SO_4$ (g./l.) | Free—$H_2SO_4$ (g./l.) | Fe (g./l.) | Al (g./l.) | Ti (g./l.) | Mg (g./l.) | Mn (g./l.) | V (g./l.) | Cr (g./l.) |
|---|---|---|---|---|---|---|---|---|
| 200–500 | 100–400 | 20–50 | 0.5–10 | 0.5–10 | 0.5–10 | 0.5–10 | 0.1–2 | 0.1–2 |

Since the discarding of untreated titanium dioxide waste acid will inevitably result in a serious problem in the form of so-called plant sewage, considerable study has already been devoted to methods of prevention or re-utilization, among which can be cited the concentration of waste acid for re-use (Ind. Eng. Chem. 44, 541, 1952) and the regeneration of sulfuric acid by hydrochloric acid (Austrian Patent No. 176,414, 1953) or other various methods. However, these methods all involve considerable trouble or are somewhat uneconomical, and therefore in practice, such waste acid is transported by ship and discarded in the ocean, or discharged into a river or sewer after being diluted or neutralized with such basic substances as lime or dolomite. Consequently there are very few cases in which titanium dioxide waste acid is commercially utilized to advantage.

On the other hand, U.S.P. 2,419,240, U.S.P. 2,427,555, U.S.P. 2,511,307 and U.S.P. 2,529,874 reveal that when a spent pickle liquor obtained by sulfuric acid pickling of iron, or an $FeSO_4 \cdot H_2SO_4 \cdot H_2O$ system solution is subjected to neutralization with ammonia or coke oven ammonia gas under air oxidizing condition, the iron is precipitated in the form of readily filterable crystalline hydrated ferrosoferric oxide $(FeO \cdot Fe_2O_3 \cdot nH_2O)$, which is then separated by filtration, the resulting filtrate forming a substantially iron-free ammonium sulfate solution. U.S.P. 2,529,874 in particular makes additional mention that the above mentioned method can presumably be applied to titanium dioxide waste acid. When we conducted a series of experimental tests with titanium dioxide waste acid on the basis of the conditions of treatment as stipulated in the said patent, however, it was found that very little readily filterable hydrated ferrosoferric oxide could be obtained, while the resultant precipitate barely sedimented, and that the filtration velocity of this precipitate was extremely slow, being in fact several ten to several hundred times slower than that of the precipitate formed in the spent pickle liquor. Consequently it is to be concluded from these experiments that the additional statement in the said patent is based on mere assumption. The fact that up to now, the method described in this patent has never been successfully applied to titanium dioxide waste acid lends support to our contention.

This invention deals with the study of why it is necessary to remove the aluminum and titanium from titanium dioxide waste acid to the extent where neither exceed more than approximately 0.5 g./l. respectively, or lower the ratio of (Al+Ti)/Fe to less than around 0.015 in order to carry out commercial production of crystalline iron oxide from the said waste acid, together with full details of a unique method for the separation of both aluminium and titanium from titanium dioxide waste acid in which the respective concentrations are maintained within the limits of the afore-mentioned critical values. This method is comprised of the following two processes (see also the accompanying flow sheet): the first consists of the adding of titanium dioxide waste acid and ammonia to a seed liquor containing readily filterable hydroxides in the form of precipitates, this adding being accomplished while stirring so as to maintain a more or less constant pH within the range of 4.5–7.0 and a temperature of 60° C. to boiling point in the reaction liquor, and removing a certain amount of this resulting mixture corresponding to the increased amount, thereby precipitating the easily filterable hydroxides of aluminum, titanium, vanadium, chromium, etc. and leading to the separation of these hydroxides from the reaction mixture. The second process comprises the introducing of ammonia into the mother liquor yielded from the separation in the first process so as to maintain a pH of 3.0 to 9.0 while oxidizing at the same time, and thereby forming crystalline iron oxide, next dividing the resulting liquor into crystalline iron oxide and a solution mainly containing ammonium sulfate. The term "crystalline iron oxide" is employed to cover goethite ($\alpha$-FeOOH), ferrosoferric oxide (FeO·Fe$_2$O$_3$) $\gamma$-ferric oxide ($\gamma$-Fe$_2$O$_3$), and their hydrates, these being formed either singly or in combination, depending on the pH value and the oxidation conditions at the time of formation. The main object of this invention is to provide for methods for the recovery and effective utilization of all the useful components of titanium dioxide waste acid in an economically advantageous manner, together with ways of treating the same for the specific purpose of preventing any harm occurring from plant sewage beforehand. Other objects will become clear during the following description and appended claims thereto.

As stated above, readily filtrable crystalline ferrosoferric oxide cannot be formed by applying the methods cited in U.S.P. 2,529,874 to such titanium dioxide waste acid. While this patent is chiefly concerned with the formation of ferrosoferric oxide, the same can be said in the case of goethite or $\gamma$-ferric oxide. Our investigations have revealed that the cause for the above may be attributed to the presence of aluminum and titanium in the said waste acid, and that furthermore, any high content of these metals will inevitably bring about poor sedimentation and filtration. In this connection, it has been recognized that for practical purposes, the permissible limits of aluminium or titanium concentration should be 0.5 g./l. respectively, or the value of (Al+Ti)/Fe around 0.015, as indicated in Table 2. In other words, the content of aluminium or titanium contained in the solution in terms of ten-thousandths to thousandths, or each ratio of these two to iron in terms of thousandths or hundredths imposes considerable influence upon the properties of the formed crystalline iron oxide, whereas the presence of magnesium, manganese, vanadium and chromium has practically no harmful effects on the formation or sedimentation and filtration performances.

levels mentioned previously or under, it is possible to form readily filtrable crystalline ferrosoferric oxide hydrates. A similar tendency may also be observed in the case of the formation of goethite or $\gamma$-ferric oxide. In either case, as long as the titanium and aluminium contained in the waste acid are first removed to a limit within the prescribed critical range, the resultant crystalline iron oxide will be of an easily filtrable nature. A problem, however, still remains in the method for separating the titanium and aluminum from the waste acid. In other words, as indicated in Table 1, the amount of iron contained in the waste acid is considerably greater than the amounts of aluminium and titanium, both absolute quantities of which are small, while a large number of metallic impurities other than iron can also be found. For this reason, the separation of titanium and aluminium from this type of liquor has never been considered before from a commercial point of view. Furthermore this method is subjected to a number of restrictions in relation to subsequent processes. This invention, however deals with this problematic matter, establishing a method of separating aluminium and titanium from titanium dioxide waste acid on a commercial scale and imparting full meaning to the contentions derived from the tests results of Table 2, thereby establishing a new and effective method of treating titanium dioxide waste acid.

It is generally taken for granted that hydroxide precipitate obtained by adding alkali to a metallic salt solution, assumes a colloidal state in which both sedimentation or filtration are extremely slow and that therefore the filtration of metal hydroxide on a commercial scale involves considerable difficulty. It is also a well-known fact that the precipitate obtained by neutralization of a solution of aluminum and titanium in sulfuric acid with ammonia likewise shows very slow sedimentation and filtration. Our studies have revealed, however, that when titanium dioxide waste acid and ammonia are introduced

TABLE 2

| No. | Content (g./l.) at 15° C. | | | | | | | | Ratio (Al-Ti)/Fe | Filtration velocity (kg./m.²/hr.) | Specific volume of sedimentation | | | |
|---|---|---|---|---|---|---|---|---|---|---|---|---|---|---|
| | Fe | Al | Ti | V | Cr | Mn | Mg | Al+Ti | | | 15 min. | 30 min. | 1 hr. | 2 hr. |
| 1 | 29.3 | 4.5 | 2.8 | 0.5 | 0.4 | 2.4 | 5.5 | 7.3 | 0.25 | 1.5 | 21.3 | 21.3 | 21.2 | 21.0 |
| 2 | 30.5 | 2.3 | 1.4 | 0.3 | 0.2 | 1.2 | 2.8 | 3.7 | 0.12 | 2.3 | 29.4 | 26.8 | 21.8 | 13.5 |
| 3 | 30.2 | 0.6 | 0.3 | 0.06 | 0.05 | 0.3 | 0.7 | 0.9 | 0.03 | 3.5 | 23.8 | 18.3 | 10.1 | 6.9 |
| 4 | 30 | 3.0 | | | | | | 3.0 | 0.10 | 1.7 | 31.3 | 29.7 | 26.0 | 16.1 |
| 5 | 30 | | 3.0 | | | | | 3.0 | 0.10 | 3.3 | 28.7 | 24.4 | 14.5 | 10.0 |
| 6 | 35 | 1.0 | | | | | | 1.0 | 0.03 | 3.7 | 21.3 | 17.9 | 12.5 | 7.0 |
| 7 | 35 | | 1.0 | | | | | 1.0 | 0.03 | 7.6 | 19.1 | 11.4 | 8.5 | 7.3 |
| 8 | 10 | 0.5 | | | | | | 0.5 | 0.05 | 2.9 | 64 | 45 | 22.0 | 11.8 |
| 9 | 10 | | 0.5 | | | | | 0.5 | 0.05 | 4.7 | 19.2 | 15.0 | 12.2 | 10.7 |
| 10 | 33 | 0.5 | | | | | | 0.5 | 0.015 | 25 | 8.3 | 6.9 | 5.9 | 5.0 |
| 11 | 33 | | 0.5 | | | | | 0.5 | 0.015 | 41 | 5.8 | 5.1 | 4.3 | 3.8 |
| 12 | 35 | | | 2.0 | | | | | | 32 | 8.1 | 6.8 | 5.8 | 5.0 |
| 13 | 35 | | | | 1.0 | | | | | 38 | 7.1 | 6.4 | 5.5 | 4.7 |
| 14 | 35 | | | | | 5.0 | | | | 57 | 7.8 | 6.0 | 5.3 | 4.9 |
| 15 | 35 | | | | | | 7.0 | | | 60 | 6.8 | 5.1 | 4.6 | 4.0 |
| 16 | 35 | 0.5 | 0.5 | | | | | 1.0 | 0.03 | 3.8 | 20.6 | 12.4 | 8.8 | 7.5 |
| 17 | 35 | 0.25 | 0.25 | | | | | 0.5 | 0.014 | 27 | 6.7 | 5.8 | 5.0 | 4.2 |
| 18 | 35 | | | | | | | | | 78 | 4.3 | 3.6 | 3.0 | 2.7 |

Table 2 shows the measured results of the filtration velocity and specific volume of sedimentation of the resulting mixture when ammonia is added to each test solution so as to maintain a reaction temperature of 75° to 80° C. and a pH of 7.5 to 8.0, while simultaneously finely dispersed air is blown into the reacting liquor, and terminating the reaction at a point where the ratio FE+++/total-Fe reaches approximately 70%. Here the filtration velocity value is expressed in terms of the dry weight of filtrated cake per unit filter area and per unit filtration time of a given vacuum filter, while the specific volume of sedimentation value is determined by dividing the volume of sedimented precipitate of the solution first placed in a mess cylinder for a given time by the dry weight of the afore-mentioned precipitate.

It will be apparent from Table 2 that when aluminium and titanium are removed from titanium dioxide waste acid to the extent of attaining the critical concentration into a seed liquor containing readily filtrable hydroxide precipitate while agitating so as to maintain a temperature of 60° C. to boiling point and a more or less constant pH within the range of 4.5 to 7.0, and the resulting mixture in an amount corresponding to the increased amount of the said liquor is recovered from the reactant system, it is possible to produce readily filterable hydroxide precipitates of aluminum, titanium, vanadium and chromium which are as easily filterable as the seed liquor. According to this method, the great majority of iron in the titanium dioxide waste acid is not precipitated, while the same can be said of the magnesium and manganese. Consequently in treating the reaction mixture by means of decantation or filtration, aluminum, titanium, vanadium and chromium can readily be separated from the mixture. This method likewise permits the continuous addition of titanium dioxide waste acid and ammonia simultaneously with the continuous formation of reaction composites to great commercial advantage.

This invention deals with this method of separation in first process, the mother liquor obtained here being treated in second process, in which the iron ion and $SO_4^-$ ion contained in the mother liquor are divided into easily filtrated crystalline iron oxide precipitate and a solution chiefly composed of ammonium sulfate.

*First process*

In the first process of this invention, the titanium dioxide waste acid and ammonia are introduced into a seed liquor containing readily filterable hydroxide precipitate while agitating so as to maintain a reaction temperature of 60° C. to a boiling point and a more or less constant pH within the range of 4.5 to 7.0, meanwhile removing the resulting mixture in an amount equal to that of the aforementioned increase from the reaction system, thus promoting the formation of readily filterable precipitates of aluminum, titanium, vanadium and chromium hydroxides which are then separated from the resulting mixture. With respect to reaction conditions in the first process, hydrogen ion concentration should be kept at a pH of 4.5 to 7.0 and preferably at about 6.0. At a pH below 4.5, the formation of precipitates is incomplete, and at a pH of higher than 7.0, the undesirable co-precipitation of iron may occur. However a pH out of the above said range may be maintained if a large amount of iron is to be co-precipitated. Additionally, the pH should be maintained as constant as possible within the range of 4.5 to 7.0 and preferably within the deviation range of ±0.2. Even if a pH is within the range of 4.5 to 7.0, a sudden change in pH will affect adversely the properties of the resulted hydroxide precipitates. The adverse effect on filtration or sedimentation may be accelerated particularly at a pH-increase. When pH is increased rapidly, fine and hard-to-filter precipitated particles occur in great number instead of precipitated particles growing into readily filterable particles with a result that filtration of the whole reacted product becomes difficult. Under microscopic observation, readily filterable precipitate has particles of bigger size and clear border between individual particles, while in hard-to-filter one border between individual particles is obscure and numerous fine particles are interposed. Both feed speed of titanium dioxide waste acid and ammonia as well as agitating condition have an influence upon the filtration and sedimentation of the resultant precipitate. When the feed speed (in other words, the feed amount per unit time against the liquor quantity in the reactor) is remarkably high, precipitated particles have no sufficient time to grow into big and rough particles as in the case of pH increase and further fine precipitated particles are formed anew resulting in difficult filtration of resultant precipitate. The feed speed of titanium dioxide waste acid, which may vary depending on the structure of a reactor and the agitating conditions, is usually advisable to be less than 2 m.³/hr. m.³—a reaction liquor. Since vigorous agitation will destroy the once formed rough particles and too slow agitation also is not satisfactory, agitation should be conducted vigorously enough not to destroy the rough particles. Higher temperature is more preferable in reaction. Filtration and sedimentation of deposit formed at a temperature between room temperature to 60° C. require more time. Thus a reaction temperature is necessary to be maintained within the range of 60° C. to a boiling point and it is more preferably to be kept at 90° C. to a boiling point. Since a reaction temperature usually reaches a boiling point (for example within the range of 106°–110° C., depending on the composition of the titanium dioxide waste acid) due to the heat of the neutralization between titanium dioxide waste acid and ammonia, the reaction may be carried out most advantageously at boiling temperature. Among ammonias used in this invention are ammonia gas, aqueous ammonia, liquid ammonia, or various industrial gases and solutions containing ammonia, the best suited are ammonia gas and aqueous ammonia. The first process can be continuously operated using one or more reactors. During operations, however, it is advisable not to change rapidly the values of these reaction conditions. The resulting precipitate formed in the first process can be readily filtered and washed by means of vacuum leaf filter or vacuum rotary drum filter. Inasmuch as the washed cake is rich in aluminum, titanium, vanadium and chromium, these useful materials may be produced therefrom.

In accordance with the following three methods of preparing seed liquor as originated by us, the seed liquor which is used in this invention can be prepared by the reaction of ammonia with one or more than two members selected from the sulfuric acid solutions of aluminum, titanium, vanadium and chromium and also titanium dioxide waste acid, and preferably by the reaction of ammonia with titanium dioxide waste acid or the sulfuric acid solution of titanium and aluminum. However, the seed liquor can also be prepared under various conditions by utilizing metals other than aluminum, titanium, vanadium and chromium, and acids other than sulfuric acid, and therefore this invention will not be restricted by either raw materials or preparing methods of seed liquor.

*Method of preparing seed liquor (1).*—At least one member selected from the group consisting of each solution of aluminum, titanium, vanadium and chromium in sulfuric acid and titanium dioxide waste acid is used as original solution. The solution being maintained at a temperature of 60° C. to a boiling point, is added with ammonia while agitating until a pH reaches 4.5 to 7.0. Thus the first reaction is ended. To about one half of the reaction liquor, the original solution is added in an amount substantially same to that of the reaction liquor, and then added with ammonia as in the case of the first reaction. Thus the second reaction is completed. By repeating the same procedures as in the second reaction, relatively easy-filterable hydroxide precipitate is formed. Too many reactions will however make the filtration or sedimentation of the precipitate slow down again. Therefore the optimum numbers of reactions should be determined based on the filtration velocity measured at the end of each reaction. The reaction mixture thus obtained may be used as seed liquid in the first process of this invention. However, in order to accelerate sedimentation and filtration of the reaction liquor, it is desirable to further treat the liquor with the method stated in mehod of preparing seed liquor (2).

Now the above said reactions were carried out under the conditions e.g. a reaction temperature 90° C., a pH about 6.0, using titanium dioxide waste acid having the composition of Table 3. The filtration velocity of solutions resulting from each reaction is shown in Table 4, and is expressed in minutes required for obtaining a cake containing a certain amount of water by vacuum filtration (−55 cm./Hg) of 100 cc. of the reaction solution with a Büchner funnel having the filtering area of 15 cm.² using a certain type of filter paper. In Table 4, it is shown that a reaction product with the fastest filtration velocity was obtained at the 4th reaction.

TABLE 3

| Free—$H_2SO_4$ (g./l.) | Fe (g./l.) | $Al_2O_3$ (g./l.) | $TiO_2$ (g./l.) | MgO (g./l.) | MnO (g./l.) | $V_2O_5$ (g./l.) | $Cr_2O_3$ (g./l.) |
|---|---|---|---|---|---|---|---|
| 174 | 34 | 0.8 | 6.0 | 5.0 | 1.4 | 1.0 | 0.3 |

TABLE 4

| Number of reactions | 1 | 2 | 3 | 4 | 5 | 6 | 7 |
|---|---|---|---|---|---|---|---|
| Filtration velocity (min.) | 102 | 30 | 26 | 22 | 40 | 45 | 70 |

*Methods of preparing seed liquor (2).*—At least one member selected from the group consisting of each solution of aluminum, titanium, vanadium and chromium in sulfuric acid and titanium dioxide waste acid is used as original solution. The solution being maintained at a temperature of 60° C. to a boiling point is added with ammonia while agitating, until a pH attains 4.5 to 7.0. Thus the first time reaction is completed. To the reaction liquor thus obtained or the comparatively filterable liquor obtained in the preceding case (1), a substantially same amount of the original solution and ammonia are gradually introduced in parallel. Thus the second reaction is effected. During the time, agitation is continued so as to maintain certain degrees of temperature within the range of 60° C. to a boiling point and a certain value of pH of 4.5 to 7.0. To about a half of the reaction liquor thus obtained, substantially same procedures as in the second reaction are conducted thus ending the third reaction. Then, by repeating reactions in a similar way as in the third reaction, readily filterable hydroxide precipitate is formed. In this case (2), the same caution should be exerted as in the preceding case (1), because the properties of the resulted hydroxide vary to a certain degree depending on the number of reactions. The filtration velocity of the resulting solution upon the completion of each reaction should be measured and the resulting solution with the fastest filtration velocity is used as seed liquor in the first process of this invention.

Now the above said reactions were carried out at a temperature of 90° C. and a pH of about 6.0, using titanium dioxide waste acid having the composition of Table 3. The filtration velocity measured at the end of each reaction is given in Table 5. The reaction liquor with the fastest filtration velocity was obtained at the 6th and 7th reaction. The filtration velocity in Table 5 has the same meaning as that of Table 4.

TABLE 5

| Number of reactions | 1 | 2 | 3 | 4 | 5 | 6 | 7 | 8 | 9 | 10 |
|---|---|---|---|---|---|---|---|---|---|---|
| Filtration velocity (min.) | 100 | 18 | 14 | 4.5 | 3.3 | 2.5 | 2.1 | 9 | 5.3 | 5.5 |

*Method of preparing seed liquor (3).*—A small amount of at least one member selected from the group consisting of each solution of aluminum, titanium, vanadium and chromium in sulfuric acid and titanium dioxide waste acid as original solution, is charged into a reactor which always shows substantially similar efficiency of agitation independent of the liquid volume contained. Then, to the solution being kept at a temperature of 60° C. to a boiling point, ammonia is added while stirring until the pH becomes 4.5 to 7.0. To the reaction liquor, the original solution is gradually added in parallel with ammonia, during which times stirring is kept continued so as to maintain a reaction temperature of 60° C. to a boiling ponit and a certain value of pH at 4.5 to 7.0. In proportion to the increase of the reaction liquor amount, the speed of the filtration and sedimentation of hydroxide precipitate in the reaction liquor gradually becomes faster. Thus a seed liquor which is suitable for the present method can be obtained. In the event the reaction liquor becomes full in the reactor, and yet filtration velocity fails to attain a satisfactory value, then further reactions as above stated are continued getting rid of a corresponding amount of the reaction liquor to that of the increased liquor until reaction product with a satisfactory filtration velocity is obtained, eventually producing seed liquor containing readily filterable hydroxide precipitate.

Now 100 litres of titanium dioxide waste acid having the composition of Table 6, was initially charged in a 1,000 litre reactor and the above specified reaction was carried out at a reaction temperature of 100° to 108° C. and a pH of 6.0 to 6.4, while titanium dioxide waste acid was gradually added in parallel with ammonia. Measuring the filtration velocity of the reaction product at certain fixed intervals, the volume of the reaction liquor was increased to 800 litres six hours later. The 800 litre reaction product thus obtained was used as sed liquor in the first process of this invention.

The filtration velocity at each interval is shown in Table 7, and this was measured with a similar method as that of Table 4.

TABLE 6

| Free—$H_2SO_4$ (g./l.) | Fe | $Al_2O_3$ | $TiO_2$ | MgO | MnO | $V_2O_5$ | $Cr_2O_3$ |
|---|---|---|---|---|---|---|---|
| 230 | 33 | 5.0 | 5.5 | 4.0 | 1.2 | 0.9 | 0.2 |

TABLE 7

| Time (min.) after the addition | 30 | 60 | 120 | 180 | 240 | 300 | 360 |
|---|---|---|---|---|---|---|---|
| Filtration velocity (min.) | 75 | 20 | 7.6 | 3.2 | 2.0 | 1.6 | 1.3 |

*Second process*

The mother liquor obtained in the first process, from which aluminium, titanium, vanadium and chromium have been recovered is an aqueous ammonium sulfate solution containing iron, magnesium, and manganese, etc. In the second process of the present invention, the mother liquor while being oxidized is introduced with ammonia so as to maintain a pH of 3.0 to 9.0, thereby yielding crystalline iron oxide which is then separated from an aqueous solution mainly comprising ammonium sulfate. In the reaction condition of the second process, if a pH is kept at 3.0 to 6.0, yellow goethite is formed, while if a pH is 6.0 to 9.0, black colored ferrosoferric oxide is formed, and upon further acceleration of oxidation this is converted into dark brown colored $\gamma$-ferric oxide. These oxides are identified as having crystal structure by means of X-ray diffraction, and their filtration and sedimentation can be carried out remarkably faster when compared with that of colloidal iron hydroxide. In the second process, if the introduction of ammonia is decreased or ceased, pH value gradually decreases due to the precipitation of oxidized iron. Therefore, the pH value should be maintained more or less constant by controlling the amount of ammonia introduced in order to obtain uniform composition of the resultant precipitate. A lower pH, generally requires prolonged period of reaction. Contrarily at a higher pH, reaction period may be shortened, but ammonia vaporization is accelerated and its recovery becomes necessary.

When a pH is low at around 3.0 to 6.0, manganese is hardly coprecipitated and as a result of which highly pure crystalline iron oxide can be obtained, which, for instance, is calcined at 800° C. to produce 99.3% pure ferric oxide ($Fe_2O_3$) and is useful as a starting material for the preparation of ferrite. At a pH higher than 7.0, increased co-precipitation of manganese takes place and this will have an adverse influence upon the purity of crystalline iron oxide formed. In the second process, a reaction temperature of higher than 60° C. is preferable. At a temperature below the specified range, the filtration of the reaction product will be adversely affected. As to oxidizing agent which may be used in the second process, the variety of oxidizing agents heretofore known can be commonly employed, including oxygen, air or oxygen-containing plant-gases, particularly in gaseous form. Usually air can sufficiently attain the purpose. Ammonia used herein may be same as that in the case of the first process. When air is used as oxidizing agent, it is advisable that stirring conditions be adequately adjusted so as to have air well dispersed in the solution. Under insufficient dispersion of air, 20 to 30 hours will be required for reaction to be completed, while under well dispersed condition, reaction will be completed within a period of 30 minutes to one hour. Either batch process or continuous process may be applied to the reaction in the second process. The completion of the reaction may be conveniently ascertained by measuring $Fe^{++}$ ion concentration in the reaction solution. Practically, if the $Fe^{++}$ ion concentration becomes less than 100 mg./l., ammonium sulfate obtained through the concentration of the reaction solution from which crystalline iron oxide has been removed is almost free from contamination or stain due to the presence of iron. The liquor, reaction of which has been thus completed may be readily filtered and washed by means of a vacuum leaf filter or vacuum rotary drum filter. The washed cake of crystalline ion oxide may be used as raw material for iron-manufacture or by turning it into red oxide by calcination, is utilized for the manufacture of paints or magnetic materials.

The method of the present invention can be applied in several ways in commercial scale production. It goes without saying that titanium dioxide waste acid can be treated directly according to the method of the present invention. Also it is possible that concentrated titanium dioxide waste acid is used for pickling iron ores, and thereafter the resulting waste liquor is treated according to the method of the present invention. Further, titanium dioxide waste acid from which almost all titanium and aluminium have been previously separated by a suitable manner can also be treated by the method of this invention. Methods for such previous separation cover the separation of aluminium as aluminum alum or potassium alum, and the separation of titanium as potassium titanium chloride or ammonium titanyl sulfate. The process in which the method to separate aluminium as aluminum alum is applied to titanium dioxide waste acid and then the methods in this invention is practised, is one bright prospect from the industrial point of view as practical applications of the method of this invention. While it is assumed that when titanium dioxide waste acid is added with a considerable amount of ammonia or ammonium sulfate and then cooled to a suitable temperature, $Fe^{++}$, $Fe^{+++}$, $Al^{+++}$, $Mg^{++}$ and $Mn^{++}$ may be crystallized in their complex form of $$FeSO_4 \cdot (NH_4)_2SO_4 \cdot 6H_2O$$
$$Fe(SO_4)_3 \cdot (NH_4)_2SO_4 \cdot 24H_2O$$
$$Al_2(SO_4)_3 \cdot (NH_4)_2SO_4 \cdot 24H_2O$$
$$MgSO_4 \cdot (NH_4)_2SO_4 \cdot 6H_2O$$

and $$MnSO_4 \cdot (NH_4)_2SO_4 \cdot 6H_2O$$

respectively, qualitative or quantitative investigation on the crystallization of these complex salts can be hardly made because of very complicated inter-relations in their ion concentrations. However we have found out that when titanium dioxide waste acid is added with ammonia or ammonium sulfate until an ammonium sulfate concentration in the liquor is maintained within the range of from 40 to 120 g./l. (if aluminium content in said waste acid is high, adjust it close to 40 g./l., and if it is low, adjust it close to 120 g./l.) and then cooled to 5° to 20° C., almost all aluminium present in said waste acid may be crystallized out in the form of relatively pure ammonium alum and by separating the said ammonium alum the aluminium content in the mother liqour can be decreased to about 1 g./l. Therefore, by treating the mother liquor with the method of this invention, the resulting precipitate in the first process can be reduced to rather a small amount. Of course it is also possible to use potassium sulfate, potassium carbonate and ammonium chloride etc. as alum-forming compounds in lieu of ammonium sulfate and ammonia. Thus it is one of the most suitable or economical ways that aluminium component present in an aluminium-containing minerals such as kaolin or allophane is dissolved into or extracted with titanium dioxide waste acid which contains free sulfuric acid and a considerable amout of alum is recovered from the resulting liquor which is then treated according to the method of the present invention. Another application of the method of the present invention is as follows: Hydroxide precipitate which has been separated in the first process that is direct application of the present method to titanium dioxide waste acid is dissolved in a relatively small amount of titanium dioxide waste acid; the resulting solution is subjected to hydrolysis at an elevated temperature thereby having almost all titanium precipitated as meta-titanic acid; the solution which is separated from the meta-titanic acid is added with ammonia or ammonium sulfate thereby crystallizing out aluminium as ammonium alum; then the solution from which the aluminium also has been recovered is treated according to the method of the invention, with the result that hydroxide precipitate to be obtained in the first process has an increased vanadium content. Such application, because it involves the separation of titanium, aluminium and vanadium, may be desirable, and it will be more effective when titanium dioxide waste acid is previously used for dissolving or extracting dil. $H_2SO_4$-soluble vanadium contained in any vanadium-containing material. These procedures as mentioned hereinbefore are similarly applicable to titanium- or chromium-containing materials.

Now the following examples will serve to illustrate the invention. It is, however, to be understood that variations in the detailed steps described above and substitution of equivalent reagents for producing the reactions required in the above methods may be made in accordance with known principles without departing from the spirit of the invention or the scope of the appended claims.

EXAMPLE 1

In this example, titanium dioxide waste acid of the composition shown in Table 8 was employed. A 1000 l. reactor provided with a stirring apparatus, feed tubes for titanium dioxide waste acid and ammonia, a thermometer and a syphon tube for the recovery of the resulting mixture, was charged with 100 l. of waste acid, to which 8.7 kg. of ammonia was added by vigorous stirring to yield a pH of 6.0, maintaining reaction temperature between 95° to 103° C. To the reaction liquor waste acid was added at the feed ratio of 180 l./hr. simultaneously in parallel with ammonia, during which stirring was continued, maintaining temperature of 100° to 108° C. and the pH of 5.8 to 6.0 in the reaction liquor. This operation was continued for four hours and yielded approximately 800 l. of reaction liquor, excluding a total of around one liter which was removed for the purpose of measuring filtration velocity. To 800 l. of the seed liquor prepared in this manner was added titanium dioxide waste acid in parallel with ammonia at a feed ratio of 420 l./hr. by stirring, maintaining a temperature of 108° C. (equal to the boiling point of the liquor) and a pH of 5.8 to 6.0 in the reaction liquor.

On the other hand, an amount of resulting mixture corresponding to the volume of increased liquid was continuously removed, these two operations being conducted on an uninterrupted basis for considerable time, and on measuring the results of the filtration velocity of the resulting mixture was found to be more or less equal to that of the seed liquor at all times. The filtration velocities shown in Table 9 were measured at fixed intervals after the commencing of the parallel addition of titanium dioxide waste acid and ammonia and represent the time required for obtaining a cake with a given water content by means of filtrating under vacuum of $-55$ cm./Hg 100 cc. of a resulting mixture of room temperature by a Büchner funnel having a filtering area of 15 cm.² and using a certain filter paper.

TABLE 8

| Free—$H_2SO_4$ (g./l.) | Fe | $Al_2O_3$ | $TiO_2$ | MgO | MnO | $V_2O_5$ | $Cr_2O_3$ |
|---|---|---|---|---|---|---|---|
| 226 | 33.3 | 5.4 | 5.6 | 6.8 | 1.6 | 0.7 | 0.2 |

TABLE 9

| Period (hr.) | 0.5 | 1 | 2 | 3 | 4 | 5 | 30 |
|---|---|---|---|---|---|---|---|
| Filtration velocity (min.) | 1.7 | 1.5 | 1.1 | 0.8 | 0.8 | 0.7 | 0.8 |

The resulting mixture obtained as above was separated and washed by means of a vacuum leaf filter, yielding a cake and a filtrate of the compositions of Table 10.

TABLE 10

CAKE

| Dry weight (kg.) | Composition (percent) | | | | | |
|---|---|---|---|---|---|---|
| | Fe | $Al_2O_3$ | $TiO_2$ | $V_2O_5$ | $Cr_2O_3$ | $NH_3$-N |
| 230 | 4.0 | 31.4 | 32.6 | 4.1 | 1.2 | 0.9 |

FILTRATE

| Volume (m.³) | Composition (g./l.) | | | | | | | |
|---|---|---|---|---|---|---|---|---|
| | Fe | $Al_2O_3$ | $TiO_2$ | MgO | MnO | $V_2O_5$ | $Cr_2O_3$ | $NH_3$-N |
| 14.0 | 31.2 | Tr. | Tr. | 6.5 | 1.5 | Tr. | Tr. | 68.3 |

A reactor was charged with 1,000 l. of the above filtrate, to which ammonium was added so as to maintain a temperature of 90° to 92° C. and a pH of 7 to 8 in the reaction liquor, meanwhile introducing 37.8 m.³ of air for a period of 1.5 hours in a manner so that it would uniformly disperse as fine bubbles within the liquor. The filtration and sedimentation performances of the black crystalline iron oxide thus derived is as indicated in Table 11, both filtration and washing operations being easy to conduct. In Table 11 the filtration velocity value is expressed in terms of the dry weight of filtrated cake per unit filter area and per unit filtration time of a given vacuum filter, while the specific volume of sedimentation value is determined by dividing the volume of sedimented precipitate of the solution first placed in a mess cylinder for a given time by the dry weight of the aforementioned precipitate. The resulting liquor containing iron oxide was then filtered and washed, yielding a cake and a filtrate of the compositions in Table 12. The cake, i.e., crystalline iron oxide contained 73.6% as $Fe^{+++}$/total-Fe and was found to be composed of a combination of hydrated ferrosoferric oxide and hydrated $\gamma$-ferric oxide in the approximate ratio of 4:1. Again 435 kg. of crystalline crude ammonium sulfate by concentrating the filtrate in Table 12, containing 19.2% $NH_3$—N, 1.5% MgO, 0.3% MnO and 4.5% $H_2O$ was obtained. Since the magnesium and manganese possess effective fertilizing properties, the crystalline crude ammonium sulfate obtained through the process can be employed intact as fertilizer.

TABLE 11

| Filtration velocity (kg./m.²/hr.) | Specific volume for sedimentation (cc./gr.) | | |
|---|---|---|---|
| | After 15 min. | After 30 min. | After 1 hr. |
| 81.9 | 14.5 | 4.7 | 2.1 |

TABLE 12

CAKE

| Dry weight (kg.) | Composition (percent) | | | | |
|---|---|---|---|---|---|
| | $Fe^{++}$ | $Fe^{+++}$ | MgO | MnO | $NH_3$—N |
| 58.0 | 14.1 | 39.7 | 0.05 | 0.26 | 0.2 |

FILTRATE

| Volume (l.) | Composition (g./l.) | | | |
|---|---|---|---|---|
| | Fe | MgO | MnO | $NH_3$—N |
| 1,050 | 0.05 | 6.2 | 1.3 | 79.5 |

EXAMPLE 2

1,000 l. of the filtrate in Table 10, which was obtained as indicated in Example 1 was placed in a reactor, and ammonia added so as to maintain a temperature of 80 to 90° C. and a pH of 8 to 9 in the reaction liquor, while finely dispersed air of 50.4 m.³ over a period of 2 hours. Then there was obtained a brown-colored precipitate of crystalline iron oxide which was readily filterable and sedimentable as shown in Table 13. The filtration velocity and specific volumes for sedimentation for Table 13 were measured by the same method as for Table 11. The resulting liquor containing iron oxide was filtered and washed, yielding a cake and a filtrate whose compositions are shown in Table 14. The cake or crystalline iron oxide had 98.0% as $Fe^{+++}$/total-Fe and mainly contained hydrated $\gamma$-ferric oxide.

TABLE 13

| Filtration velocity (kg./m.²/hr.) | Specific volume for sedimentation | | |
|---|---|---|---|
| | After 15 min. | After 30 min. | After 1 hr. |
| 92.5 | 13.7 | 4.5 | 2.0 |

TABLE 14

CAKE

| Dry weight (kg.) | Composition (percent) | | | | |
|---|---|---|---|---|---|
| | $Fe^{++}$ | $Fe^{+++}$ | MgO | MnO | $NH_3$—N |
| 47.0 | 1.5 | 64.9 | 0.10 | 1.9 | 0.15 |

FILTRATE

| Volume (l.) | Composition (g./l.) | | | |
|---|---|---|---|---|
| | Fe | MgO | MnO | $NH_3$—N |
| 1,040 | 0.01 | 6.2 | 0.6 | 80.5 |

EXAMPLE 3

The filtrate of 700 l. as obtained by Example 1 and shown in Table 10, was charged in a reactor and finely dispersed air of 205 m.³ was introduced over a period of two hours and fifty-one minutes, together with ammonia added thereto so as to maintain the reaction temperature at 87° to 92° C. and a pH at 4 to 5. The resulting yellow-colored crystalline iron oxide had the properties of filtration and sedimentation as seen in Table 15, and was readily filtered and washed by means of a vacuum drum filter. The iron oxide had 99.0% as $Fe^{+++}$/total-Fe and had not any magneticity. The result of X-ray diffraction showed the presence of goethite.

The iron oxide burned at 800° C. had 99.3% $Fe_2O_3$ in purity.

TABLE 15

| Filtration velocity (kg./m.²/hr.) | Specific volume for sedimentation (cc./gr.) | | |
|---|---|---|---|
| | After 15 min. | After 30 min. | After 1 hr. |
| 51.9 | 9.1 | 3.3 | 2.9 |

EXAMPLE 4

In this example, titanium dioxide waste acid which had decomposed allophane and contained aluminium present in the allophane, was employed. The composition of such aluminium-enriched waste acid is shown in Table 16.

TABLE 16

| Total—$H_2SO_4$ (g./l.) | Free—$H_2SO_4$ (g./l.) | Fe (g./l.) | $Al_2O_3$ (g./l.) | $TiO_2$ (g./l.) | MgO (g./l.) | MnO (g./l.) | $V_2O_5$ (g./l.) | $Cr_2O_3$ (g./l.) |
|---|---|---|---|---|---|---|---|---|
| 322 | 146 | 29.3 | 34.0 | 4.9 | 5.9 | 1.1 | 0.7 | 0.2 |

39 kilograms of ammonia gas were added to 1,500 l. of the solution having the composition of Table 16 and the mixture was cooled to 20° C. to have ammonium alum crystallized out. The crystallized mass was separated by filtration and then washed with a little amount of ammonium sulfate solution having the concentration of about 10% to yield an ammonium alum and a filtrate. Their compositions are shown in Table 17.

TABLE 17
CRUDE AMMONIUM ALUM

| Crystal (kg.) | Composition (percent) | | | |
|---|---|---|---|---|
| | $Al_2O_3$ | $NH_3$—N | Fe | Free—$H_2O$ |
| 453 | 11.1 | 3.05 | 0.2 | 1.9 |

FILTRATE

| Volume (l.) | Composition (g./l.) | | | | | | | | |
|---|---|---|---|---|---|---|---|---|---|
| | Free—$H_2SO_4$ | Fe | $Al_2O_3$ | $TiO_2$ | MgO | MnO | $V_2O_5$ | $Cr_2O_3$ | $NH_3$—N |
| 1,550 | 69 | 26.1 | 0.7 | 4.7 | 5.7 | 1.1 | 0.7 | 0.2 | 15.4 |

30 liters of the filtrate as specified in Table 17 were charged in a 50 l. reactor provided with a steam jacket, a stirrer, a reflux condenser, a thermometer, a feed pipe and an exhaust pipe. With vigorous agitation at 100° to 180° C., ammonia gas was blown to have a pH of 6.0. The filtration velocity after completion of the first reaction was measured. Then to 15 l. of the above reaction liquor, 15 l. of the said filtrate of Table 17 and ammonia gas in parallel were added over a period of 30 minutes so as to maintain a reaction temperature at 100° to 108° C. and a pH at 6.0 to 6.4, and then the filtration velocity of the liquor resulting from the second reaction was determined. Then substantially similar procedures were repeated until the filtration velocity reached a maximum point at the sixth shown in Table 8. Therefore, the liquor which was obtained through the sixth reaction was employed as seed liquor. To 30 l. of the liquor while being heated and stirred, the filtrate of Table 17 was added at a feed ratio of 30 l./hr. in parallel with ammonia so as to maintain a reaction temperature of 100° to 108° C. and a pH of 6.0 to 6.2. On the other hand, the resulting mixture in an amount corresponding to that of the introduced mass was continuously removed. The filtration velocity of the resulting mixture being 1.5 to 3.5 in minute shown in Table 18 had no significant difference from that of the seed liquor at any time over the period during which 600 l. of the filtrate of Table 17 were treated. The filtration velocity shown in Table 18 has the same meaning as in Table 9.

TABLE 18

| Number of reactions | 1 | 2 | 3 | 4 | 5 | 6 | After initiating continuous reaction |
|---|---|---|---|---|---|---|---|
| Filtration velocity (min.) | 50 | 15 | 4 | 3.8 | 3.3 | 2.5 | 1.5–3.6 |

The resultant was filtered and washed to yield a cake and a filtrate. Their compositions are set forth in Table 19.

TABLE 19
CAKE

| Dry weight (kg.) | Composition (Percent) | | | | | |
|---|---|---|---|---|---|---|
| | Fe | $Al_2O_3$ | $TiO_2$ | $V_2O_5$ | $Cr_2O_3$ | $NH_3$—N |
| 5.1 | 0.6 | 8.2 | 55.3 | 8.2 | 2.3 | 0.8 |

FILTRATE

| Volume (l.) | Composition (g./l.) | | | | | | | |
|---|---|---|---|---|---|---|---|---|
| | Fe | $Al_2O_3$ | $TiO_2$ | MgO | MnO | $V_2O_5$ | $Cr_2O_3$ | $NH_3$—N |
| 650 | 24.0 | Tr. | Tr. | 5.3 | 1.0 | Tr. | Tr. | 35.0 |

The filtrate of Table 19, 650 l. was charged in a reactor and then treated by the similar procedure as in Example 1, thereby to yield a reaction mixture showing the filtration velocity as well as specific volume of sedimentation as shown in Table 20. These data were measured in the similar way as in Table 11. Then the mixture was filtered and washed, yielding crystalline iron oxide as cake and ammonium sulfate solution as filtrate, each of which had the compositions as seen in Table 21.

TABLE 20

| Filtration velocity (Kg./m.²/hr.) | Specific volume of sedimentation (cc./g.) | | |
|---|---|---|---|
| | After 15 min. | After 30 min. | After 1 hr. |
| 75.8 | 12.1 | 5.2 | 3.8 |

TABLE 21

| Cake | | | | | Filtrate | | | | |
|---|---|---|---|---|---|---|---|---|---|
| Dry weight (kg.) | Composition (Percent) | | | | Volume (l.) | Composition (g./l.) | | | |
| | $Fe^{++}$ | $Fe^{+++}$ | MgO | MnO | | Fe | MgO | MnO | $NH_3$—N |
| 30.0 | 14.2 | 38.2 | 0.04 | 0.43 | 700 | 0.04 | 4.9 | 0.7 | 43.8 |

EXAMPLE 5

In the same manner as in the first process of Example 1, titanium dioxide waste acid was treated, and hydroxide precipitate as cake having the compositions of Table 22 was obtained.

TABLE 22

| Fe (Percent) | Al$_2$O$_3$ (Percent) | TiO$_2$ (Percent) | V$_2$O$_5$ (Percent) | Cr$_2$O$_3$ (Percent) | NH$_3$—N (Percent) | Free—H$_2$O (Percent) |
|---|---|---|---|---|---|---|
| 2.2 | 17.3 | 17.9 | 2.3 | 0.7 | 0.5 | 45.0 |

60 kg. of the cake of Table 22 were dissolved into 170 l. of titanium dioxide waste acid having the compositions of Table 23, and then the solution was heated at the boiling point over a period of 2 hours to effect hydrolysis of titanium compounds contained in the solution to yield meta-titanic acid as precipitate. The precipitate was separated by filtration thereby yielding crude meta-titanic acid and a filtrate, each of whose compositions is mentioned in Table 24.

TABLE 23

| Free—H$_2$SO$_4$ (g./l.) | Fe | Al$_2$O$_3$ | TiO$_2$ | MgO | MnO | V$_2$O$_5$ | Cr$_2$O$_3$ |
|---|---|---|---|---|---|---|---|
| 358 | 40.4 | 8.6 | 7.72 | 8.46 | 1.10 | 1.10 | 0.27 |

TABLE 24

| Crude metatitanic acid | | | Filtrate | | | | | | | |
|---|---|---|---|---|---|---|---|---|---|---|
| Wet weight (kg.) | Composition (Percent) | | Volume (l.) | Composition (g./l.) | | | | | | |
| | TiO | Free—H$_2$O | | Fe | Al$_2$O$_3$ | TiO$_2$ | MgO | MnO | V$_2$O$_5$ | Cr$_2$O$_3$ | NH$_3$—N |
| 23.9 | 43.5 | 45.0 | 164 | 49.0 | 72.5 | 9.8 | 8.5 | 1.2 | 9.7 | 2.7 | 1.8 |

To 164 l. of the above filtrate, 100 kg. of 25% solution of ammonium sulfate was added and then cooled to 20° C. to crystallize out ammonium alum, which was followed by centrifugal separation and washing with 10% (NH$_4$)$_2$SO$_4$ aq. solution thereby to yield crystalline crude ammonium alum and a filtrate, each of which had the compositions as mentioned in Table 25.

TABLE 25

CRUDE AMMONIUM ALUM

| Crystal (kg.) | Composition (percent) | | | |
|---|---|---|---|---|
| | Al$_2$O$_3$ | NH$_3$—N | Fe | Free—H$_2$O |
| 101 | 11.1 | 3.03 | 0.2 | 2.0 |

FILTRATE

| Volume (l.) | Composition (g./l.) | | | | | | | |
|---|---|---|---|---|---|---|---|---|
| | Fe | Al$_2$O$_3$ | TiO$_2$ | MgO | MnO | V$_2$O$_5$ | Cr$_2$O$_3$ | NH$_3$-N |
| 220 | 35.8 | 2.5 | 7.3 | 6.3 | 0.9 | 7.1 | 2.0 | 15.9 |

The above filtrate and ammonia were added in parallel to the seed liquor which contained readily filterable hydroxide precipitate. The reaction temperature of 109° C. and a pH of 5.8 to 6.0 were maintained. In the while the resulting mixture in an amount corresponding to the increased one was removed. Thus 220 l. of the filtrate of Table 25 were treated, yielding a cake and a filtrate which had the compositions as shown in Table 26.

TABLE 26

CAKE

| Dry weight (kg.) | Composition (Percent) | | | | | |
|---|---|---|---|---|---|---|
| | Fe | Al$_2$O$_3$ | TiO$_2$ | V$_2$O$_5$ | Cr$_2$O$_3$ | NH$_3$—N |
| 7.0 | 2.4 | 9.0 | 24.0 | 22.5 | 1.7 | 0.8 |

FILTRATE

| Volume (l.) | Composition (g./l.) | | | | | | | |
|---|---|---|---|---|---|---|---|---|
| | Fe | Al$_2$O$_3$ | TiO$_2$ | MgO | MnO | V$_2$O$_5$ | Cr$_2$O$_3$ | NH$_3$-N |
| 245 | 33.5 | Tr. | Tr. | 6.1 | 0.9 | Tr. | Tr. | 99.0 |

The above vanadium-rich cake from which vanadium is readily separable is useful as raw material in the manufacture of various vanadium-containing materials. The filtrate of Table 26 may be similarly treated as in the preceding examples to recover crystalline iron oxide as well as a solution mainly comprising of ammonium sulfate.

In the method of the present invention wherein only ammonia is used as principal raw material, it is not only possible to recover all the metallic components present in titanium dioxide waste acid in good yield, but also possible to recover the once used ammonia without a substantial loss. That is to say, titanium, aluminium, vanadium, chromium, etc. which are present in titanium dioxide waste acid can be recovered in the form of hydroxide in the first process of the present method, and almost all part of iron can be recovered in the form of crystalline iron oxide in the second process. Ammonia, which is used as principal raw material, together with SO$_4$-ion present in the waste acid can be recovered in the form of crystalline crude ammonium sulfate in the second process too. Magnesium and manganese present in the waste acid can be taken up in the crude ammonium sulfate, and can be utilized without separation, because of their effectiveness as fertiilzer. Of course the separation of magnesium and manganese from the crude ammonium sulfate is possible, if desired. For instance, ammonium sulfate having the ammonium nitrogen content substantially equal to that of commercial grade ammonium sulfate, and ammonium magnesium sulfate

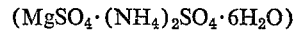

$$(MgSO_4 \cdot (NH_4)_2SO_4 \cdot 6H_2O)$$

can be obtained through fractional crystallization from the crude ammonium sulfate. As stated already herein, aluminium and titanium may be recovered as ammonium alum and meta-titanic acid respectively, the former being useful as sizing agents for paper, clarifying agents for aqueous solutions and the latter for the preparation of titanium dioxide. Crystalline iron oxide is useful for the manufacture of iron and also for the preparation of magnetic materials, recording materials, pigments, abrasives, electrode materials, etc. It is noteworthy that valuable vanadium can be recovered with an excellent yield ratio according to the method of the present invention.

What is claimed:

1. A process for producing ammonium sulfate, crystalline iron oxide and metal hydroxide easily separable by filtration and consisting essentially of from one to four members selected from the group consisting of the hydroxides of aluminum, titanium, vanadium and chromium, from an aqueous solution of ferrous sulfate containing from one to two members selected from the group consisting of titanium sulfate and aluminum sulfate, which comprises introducing said aqueous solution of ferrous sulfate and ammonia into an aqueous liquor seeded with said metal hydroxide while stirring, heating at a temperature of from about 60° C. to the boiling point and removing a portion of the resulting mixture corresponding to the amount of the inroduced aqueous solution of ferrous sulfate and ammonia, while maintaining a constant pH within the range of 4.5 to 7.0 therein, thereby stimulating the growth of the hydroxide particles in said portion, separating said hydroxide from the removed portion of the mixture, introducing ammonia into the resulting mother liquor so as to maintain a pH of 3.0 to 9.0 and concurrently feeding gas containing molecular oxygen in a finely dispersed form thereinto, thereby producing crystalline iron oxide and an ammonium sulfate solution, and finally separating the crystalline iron oxide from the ammonium sulfate solution.

2. A process for producing ammonium sulfate, crystalline iron oxide and metal hydroxide easily separable by filtration and consisting essentially of from one to four members selected from the group consisting of the hydroxides of aluminum, titanium, vanadium and chromium from an aqueous solution of ferrous sulfate containing from one to two members selected from the group consisting of titanium sulfate and aluminum sulfate, which comprises introducing said aqueous solution of ferrous sulfate and ammonia into an aqueous liquor seeded with said metal hydroxide while stirring, heating at the boiling point and removing a portion of the resulting mixture corresponding to the amount of the introduced aqueous solution of ferrous sulfate and ammonia, while maintaining a pH of approximately 6.0 therein, thereby stimulating the growth of the hydroxide particles in said portion, separating said hydroxide from the removed portion of the mixture, introducing ammonia into the resulting mother liquor so as to maintain a pH of 6.0 to 9.0 and concurrently feeding air in a finely dispersed form thereinto, thereby producing crystalline iron oxide composed of at least one member selected from the group consisting of γ-ferric oxide and ferrosoferric oxide and an ammonium sulfate solution, and separating the crystalline iron oxide from the ammonium sulfate solution.

3. A procees for producing ammonium sulfate, crystalline iron oxide and metal hydroxide easily separable by filtration and consisting essentially of from one to four members selected from the group consisting of the hydroxides of aluminum, titanium, vanadium and chromium from an aqueous solution of ferrous sulfate containing from one to two members selected from the group consisting of titanium sulfate and aluminum sulfate, which comprises introducing said aqueous solution of ferrous sulfate and ammonia into an aqueous liquor seeded with said metal hydroxide while stirring, heating at the boiling point and removing a portion of the reaction mixture corresponding to the amount of the introduced aqueous solution of ferrous sulfate and ammonia, while maintaining a pH of approximately 6.0 therein, thereby stimulating the growth of the hydroxide particles in said portion, separating said hydroxide from the removed portion of the mixture, introducing ammonia into the resulting mother liquor so as to maintain a pH of 3.0 to 6.0 and concurrently feeding air in a finely dispersed form thereinto, thereby producing crystalline iron oxide chiefly composed of goethite and an ammonium sulfate solution, and finally separating the crystalline iron oxide from the ammonium sulfate solution.

4. The process claimed in claim 1, wherein the aqueous solution of ferrous sulfate is waste acid liquor derived from hydrolysis of titanium sulfate solutions.

5. A process for producing ammonium alum, ammonium sulfate, crystalline iron oxide and metal hydroxide, easily separable by filtration and consisting essentially of from one to four members selected from the group consisting of the hydroxides of aluminum, titanium, vanadium and chromium, which comprises adding from one to two members selected from the group consisting of ammonia and ammonium sulfate to waste acid liquor derived from hydrolysis of titanium sulfate solution, until the ammonium sulfate concentration reaches 40 to 120 grams per liter, cooling the mixture to above 5° to 20° C. to crystallize ammonium alum therefrom, and separating said alum from the resulting aqueous solution of ferrous sulfate, introducing the latter solution and ammonia into an aqueous liquor seeded with said metal hydroxide while stirring, heating at a temperature of from about 60° C. to the boiling point and removing a portion of the resulting mixture corresponding to the amount of the introduced aqueous solution of ferrous sulfate and ammonia, while maintaining a constant pH within the range of 4.5 to 7.0 therein, thereby stimulating the growth of the hydroxide particles in said portion, separating said hydroxide from the removed portion of the mixture, introducing ammonia into the resulting mother liquor so as to maintain a pH of 3.0 to 9.0 and concurrently feeding gas containing molecular oxygen in a finely dispersed form thereinto, thereby producing crystalline iron oxide and an ammonium sulfate solution, and finally separating the crystalline iron oxide from the ammonium sulfate solution, and finally separating the crystalline iron oxide from the ammonium sulfate solution.

6. A process for producing ammonium alum, ammonium sulfate, crystalline iron oxide and metal hydroxide, easily separable by filtration and consisting essentially of from one to four members selected from the group consisting of the hydroxides of aluminum, titanium, vanadium and chromium, which comprises dissolving the aluminum content from an aluminum-containing ore into waste acid liquor derived from hydrolysis of titanium sulfate solutions, adding from one to two members selected from the group consisting of ammonia and ammonium sulfate to the aluminum-enriched waste acid until the ammonium sulfate concentration reaches about 40 to 120 grams per liter, cooling the mixture to about 5° to 20° C. to crystallize ammonium alum therefrom, and separating said alum from the resulting aqueous solution of ferrous sulfate, introducing the latter solution and ammonia into an aqueous liquor seeded with said metal hydroxide while stirring and heating at a temperature of from about 60° C. to the boiling point and removing a portion of the resulting mixture corresponding to the amount of the introduced aqueous solution of ferrous sulfate and ammonia, while maintaining a constant pH within the range of 4.5 to 7.0 therein, thereby stimulating the growth of the hydroxide particles in said portion, separating said hydroxide from the removed portion of the mixture, introducing ammonia into the resulting mother liquor so as to maintain a pH of 3.0 to 9.0 and concurrently feeding gas containing molecular oxygen in a finely dispersed form thereinto, thereby producing crystalline iron oxide and an ammonium sulfate solution, and finally separating the crystalline iron oxide from the ammonium sulfate solution.

7. A process for producing ammonium alum, ammonium sulfate, crystalline iron oxide and metal hydroxide easily separable by filtration and consisting essentially of from one to four members selected from the group consisting of the hydroxides of aluminum, titanium, vanadium and chromium, which comprises dissolving from one to four of the said hydroxides in waste acid liquor derived from hydrolysis of titanium sulfate solution, subjecting the resulting solution to hydrolysis, thereby precipitating metatitanic acid therefrom, and separating the latter, adding at least one member selected from the group consisting of ammonia and ammonium sulfate to the solution from which said metatitanic acid has been removed, until the ammonium sulfate concentration reaches about 40 to 120 grams per liter, cooling the mixture to about 5° to 20° C. to crystallize ammonium alum therefrom, and separating the alum from the resulting aqueous solution of ferrous sulfate, introducing the latter solution and ammonia into an aqueous liquor seeded with said metal hydroxide while stirring, heating at a temperature of from about 60° C. to the boiling point and removing a portion of the resulting mixture corresponding to the amount of the introduced aqueous solution of ferrous sulfate and ammonia, while maintaining a constant pH within the range of 4.5 to 7.0 therein, thereby stimulating the growth of hydroxide particles in said portion, separating said hydroxide from the removed portion of the mixture, introducing ammonia into the remaining mother liquor so as to maintain a pH of 3.0 to 9.0 while feeding gas containing molecular oxygen in a finely dispersed form thereinto, thereby producing crystalline iron oxide and an ammonium sulfate solution, and finally separating the crystalline iron oxide from the ammonium sulfate solution.

References Cited in the file of this patent

UNITED STATES PATENTS

| | | |
|---|---|---|
| 2,529,874 | Hoak | Nov. 14, 1950 |
| 2,622,013 | Mayer | Dec. 16, 1952 |
| 2,864,670 | Walwark | Dec. 16, 1958 |